United States Patent [19]

Travis

[11] 4,270,622
[45] Jun. 2, 1981

[54] DRIVE AXLE FOR ELECTRIC VEHICLE

[76] Inventor: James M. Travis, 3704 Oakshire, Pontiac, Mich. 48054

[21] Appl. No.: 52,626

[22] Filed: Jun. 27, 1979

[51] Int. Cl.³ .............................................. B60K 1/00
[52] U.S. Cl. ............................... 180/65 C; 74/665 M; 74/713; 180/65 D; 180/65 E; 180/54 C
[58] Field of Search ................. 180/65 D, 65 C, 65 E, 180/65 R, 57, 54 C, 60, 62; 74/665 GB, 665 M, 710, 713; 310/113, 118, 122

[56] References Cited

U.S. PATENT DOCUMENTS

| | | | |
|---|---|---|---|
| 1,340,249 | 5/1920 | Pieper | 290/19 |
| 1,469,264 | 10/1923 | Lubeck | 188/159 |
| 1,551,594 | 9/1925 | Walter | 180/65 R |
| 1,661,780 | 3/1928 | Worus | 180/65 R |
| 1,951,089 | 3/1934 | Fielder | 180/65 |
| 2,238,615 | 4/1941 | Wolf | 180/54 C |
| 2,317,324 | 4/1943 | Wolf | 180/54 C |
| 2,588,341 | 3/1952 | Beck | 214/83.36 |
| 2,589,788 | 3/1952 | Fell | 180/54 C |
| 3,119,537 | 1/1964 | Smits | 74/665 M |
| 3,211,249 | 10/1965 | Papst | 180/65 |
| 4,039,037 | 8/1977 | Vin | 180/70 PX |

FOREIGN PATENT DOCUMENTS

| | | | |
|---|---|---|---|
| 2559438 | 3/1977 | Fed. Rep. of Germany | 180/65 D |
| 70195 | 1/1952 | Netherlands | 74/665 GB |

*Primary Examiner*—John J. Love
*Assistant Examiner*—D. W. Underwood
*Attorney, Agent, or Firm*—Basile, Weintraub & Hanlon

[57] ABSTRACT

An electric powered vehicle drive axle is disclosed. The axle of the present invention comprises a ring gear; a first pinion gear for rotating the ring gear; a differential carried by the ring gear; a pair of axle shafts driven by the differential for rotatably driving a pair of drive wheels; the device supported and enclosed by a housing. A second pinion gear is employed which rotatably engages the ring gear. A first electric motor rotatably connected to the first pinion gear is connected to a power source for rotatably driving the vehicle. A second electric motor/generator is connected to the second pinion gear and electrically connected to the power source. The second electric motor/generator selectively powers the differential or derives power from the differential to recharge the power source as dictated by the power needs of the electric vehicle. A plurality of bevel gears are deployed along the length of the axles. Each bevel gear is rotatably connected to a pair of opposed bevel gears, each opposed bevel gear is rotatably connected to an electric motor/generator. By selectively and electrically causing the plurality of motors/generators to either power the axle or be powered by the axle optimum efficiency and recharging of the battery over a range of vehicle operating conditions is obtained.

4 Claims, 4 Drawing Figures

U.S. Patent        Jun. 2, 1981        4,270,622
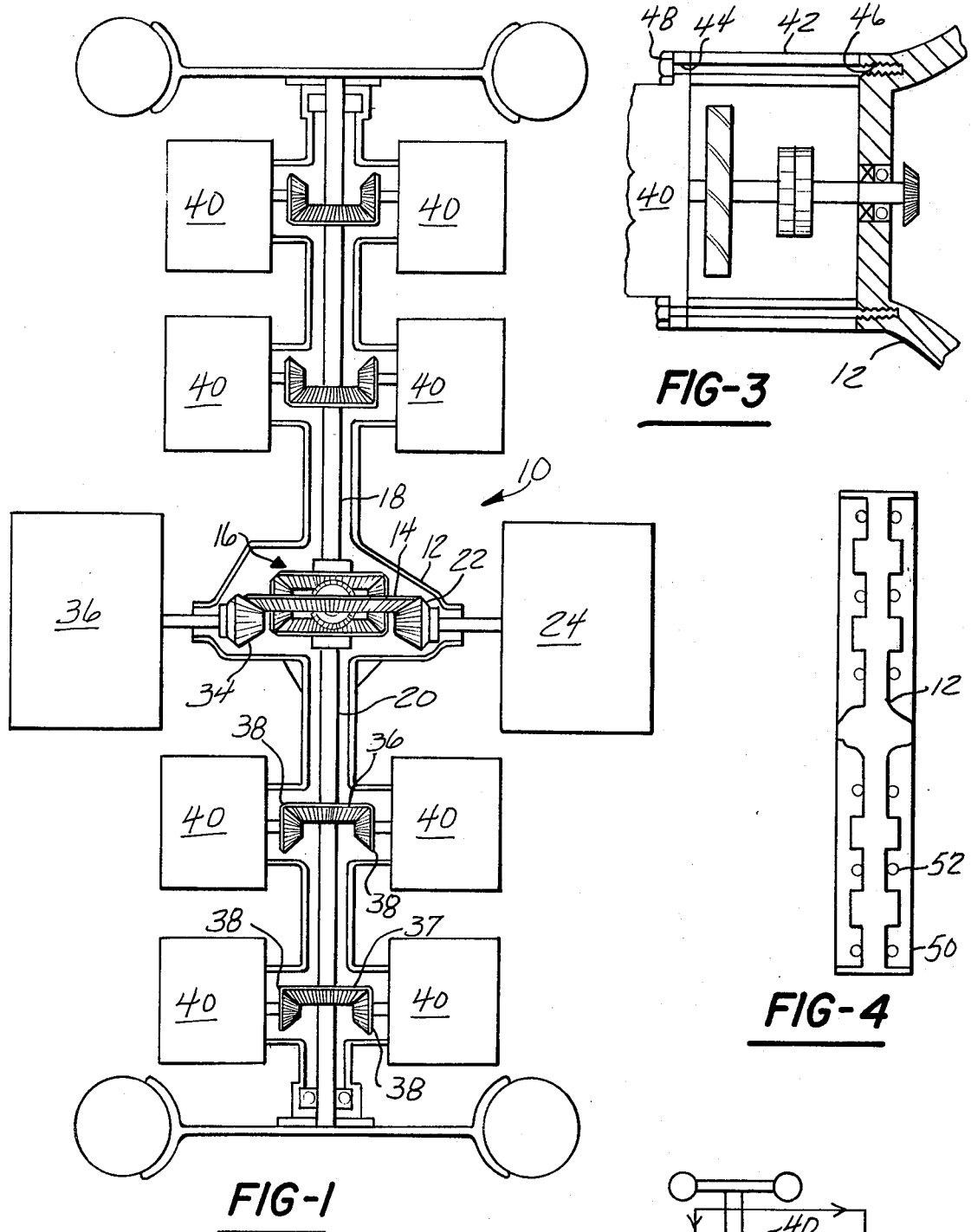
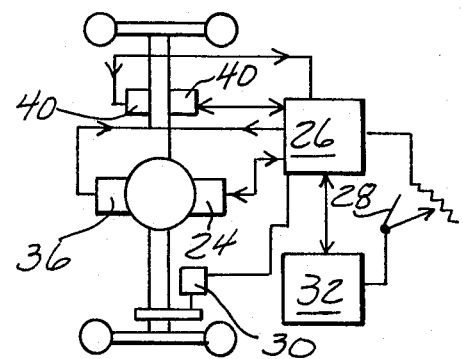

DRIVE AXLE FOR ELECTRIC VEHICLE

BACKGROUND OF THE INVENTION

I. Field of the Invention

The present invention relates to the field of drive axles for electric vehicles, and more particularly the present invention relates to drive axles for electric vehicles employing a plurality of electric motors/generators coupled to the axle and selectively controlled to drive or be driven by the axle for optimum vehicle operating efficiency.

II. Prior Art Statement

Electric powered vehicles and drive axles therefore have long been known. A search of the issued United States Patents reveals the following patents which disclose a drive axle for electric vehicles: U.S. Pat. Nos. 1,340,249; 1,951,089; 1,551,594; and 3,211,249. Electric vehicle axles which employ more than one electric motor to drive the vehicle also are known. U.S. Pat. Nos. 1,661,780 and 2,588,341 discloses more than one electric motor for driving the vehicle. Dynamic braking or regenerative braking systems for feeding back the inertial energy contained in the vehicles forward motion into the power source when the vehicle is slowed or coasting down hill also are known. U.S. Pat. No. 1,469,264 discloses a regenerative braking system for electrically driven vehicles.

None of the above listed United States Patents which constitute the closest art to the present invention, disclose a drive axle for electric powered vehicles comprising a plurality of electric motors/generators coupled to the axle for selectively powering the axle or absorbing energy from the axle for optimum vehicle efficiency.

SUMMARY OF THE INVENTION

The present invention comprises a drive axle for an electric powered vehicle of the type having a rechargeable battery power source, an electric motor rotatably connected to the axle and means for interconnecting the power source to the electric motor in a controllable manner. The drive axle comprises a ring gear; a first pinion gear for rotating the ring gear; a differential carried by the ring gear; a pair of opposed axle shafts interconnected to the differential; a housing enclosing and supporting the elements of the axle; and a pair of drive wheels rotatably supported by the housing and driven by the opposed axle shafts. The axle further comprises a second pinion gear rotatably engaging the ring gear and a second electric motor/generator rotatably connected to the second pinion. The second electric motor/generator is electrically interconnected to the power source in a controllable manner so that the second electric motor/generator is selectively free wheeling, powering the axle, or absorbing power from the axle to recharge the power source.

In a preferred embodiment of the present invention a plurality of bevel gears are disposed along the opposed axle shafts in a spaced apart manner and rotatably driven by the axle shafts. A plurality of pairs of opposed bevel gears rotatably engage each bevel gear. Each opposed bevel gear is rotatably connected to an electric motor/generator. Each electric motor/generator is electrically connected to the power source in a controlled manner so that each electric motor/generator is selectively operated as a free wheeling device, an electric motor powering the axle, or an electric generator deriving power from the axle to recharge the power source, depending on the vehicle speed and the operator's command.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein:

FIG. 1 illustrates a preferred embodiment of the axle of the present invention;

FIG. 2 illustrates a block diagram of the present invention including the axle, the electric motor/generator, the battery, and a control therefore;

FIG. 3 illustrates an enlarged cross-sectional view of a spacer and coupling arrangement for placing a cooling fan on the shaft of the motor/generator; and FIG. 4 illustrates a shield for protecting the axle.

DESCRIPTION OF THE PREFERRED EMBODIMENT

Referring now to the drawings and in particular to FIG. 1 wherein there is illustrated at 10 a preferred embodiment of the present invention. The drive axle for an electric powered vehicle of the present invention comprises a housing 12 which rotatably supports a ring gear 14. The ring gear 14 supports for rotation therewith a differential 16 which rotatably drives a pair of opposed axles 18,20. A first pinion 22 drivingly engages the ring gear 14 and is rotatably connected to a first electric motor/generator 24. The electric motor/generator 24 is selectively controlled by a control 26 (FIG. 2) which determines from the position of an operator's speed pedal 28 and a vehicle speed indicator 30 whether the motor/generator 24 should be feeding power to a battery 32 or absorbing power from the battery 32 to accelerate the vehicle.

A second pinion 34 is rotatably interconnected to the ring gear 14 and drives a second motor/generator 36. The motors/generators 24,36 are selected to have complementary peak efficiency characteristics so that the control 26 can select which of the motors/generators is to be used to derive the maximum vehicle efficiency for the position of the operator pedal and the vehicle speed indicated by the indicator 30. By judicious use of the motors/generators 24,36 high efficiency for the vehicle is obtainable over a wide range of operating conditions.

In a preferred embodiment the axle 10 has deployed along the opposed axle shafts 18,20, a plurality of bevel gears 37 affixed to the opposed axle shafts 18,20 for rotation therewith. A plurality of opposed bevel gears 38 are meshed with the bevel gears 37. A pair of opposed bevel gears 38 are provided for each bevel gear 37. The bevel gears 38 are each interconnected to a plurality of electric motors/generators 40 so that the plurality of electric motors/generators 40 may be selectively driven by the axle 10 or the axle 10 can alternately absorb power from the plurality of the electric motors/generators. Each of the plurality of electric motors/generators 40 is interconnected electrically to the control 26, and the control 26 determines whether each motor/generator 40 should be free wheeling, delivering power to the power source 32, or absorbing power from the power source 32 for driving the vehicle.

It is known to the skilled artisan that electric motors and generators have a peak efficiency which falls off at parameters above or below the point at which the peak efficiency occurs. It is also known to the skilled artisan that if a designer of an electric motor/generator desires to obtain a relatively high efficiency over a broad range of parameters that the peak efficiency is sacrificed to obtain the broader average efficiency. By utilizing the axle of the present invention the skilled artisan can employ a plurality of electric motors/generators each having a peak efficiency differing from the others and having a very high efficiency at the peak efficiency point without concern for the rapid fall off of the efficiency at either side of the peak operating parameter. The need for a moderately high efficiency over a broad spectrum is not required because another electric motor/generator 40 with a peak efficiency at the parameters prevalent can be switched on to carry the load and the previous motor/generator switched off when it's efficiency has declined.

Referring, again to the drawings, and in particular to FIG. 3 wherein there is illustrated an enlarged cross sectional view of a mounting and coupling arrangement for an air cooled motor/generator. A plurality of tubular spacers 42 are positioned between the generator 40 and the housing 12, the space between spacers allows a free circulation of air around and through the spacers. The spacers are aligned with a plurality of apertures 44 in a mounting flange of the motor/generator 40 and a plurality of threaded apertures 46 threadingly engage a threaded end of a plurality of bolts 48. The bolts 48 pass through the spacers 42 to secure the motor/generator 40 to the housing 12.

Referring now to FIG. 4, a shield 50 surrounds the underside of the housing 12 protecting the axle and the air inlet of the motor/generator from contamination. A plurality of "U" bolts 52 pass over the axle with an open threaded end pointed down. The threaded end of the "U" bolts are aligned with and pass through a plurality of apertures in the shield. A plurality of nuts engage the threaded end to secure the shield to the axle.

There has been described hereinabove a drive axle for electric motor vehicles which provides a plurality of electric motors/generators which drive the axle. Each motor/generator selected to produce the maximum possible efficiency over a narrow range, with each motor/generator complimenting the other to collectively provide a very high efficiency over a broad range of parameters. By employing the axle of the present invention higher vehicle operating efficiency can be achieved, and regenerative power can be used to recharge the batteries under conditions of downhill running and deceleration.

Having thus described my invention what I claim is:

1. In an electric powered vehicle of the type having a battery power source, a first electric motor, a drive axle rotatably driven by the motor, a housing, a ring gear, a first pinion gear for rotating the ring gear, and a differential carried by the ring gear, the differential driving a pair of axle shafts for rotatably driving a pair of drive wheels rotatably supported by the housing, the improvement comprising:
   a second pinion gear rotatably engaging the ring gear, a second electric motor/generator rotatably connected to the second pinion;
   a bevel gear affixed to one of the axle shafts for rotation therewith;
   a pair of opposed bevel gears rotatably engaging the bevel gear; and
   a third and fourth electric motor generator supported by the housing and rotatably connected to the opposed bevel gears for rotation therewith.

2. The electric powered vehicle as defined in claim 1 further comprising:
   one or more bevel gears attached to each axle shaft for rotation therewith;
   a plurality of pairs of opposed bevel gears rotatably engaging each bevel gear; and
   a plurality of electric motor/generator rotatably connected to each opposed bevel gear for rotation therewith.

3. The electric powered vehicle as defined in claim 1 further comprising:
   a shield surrounding an underside of said housing;
   said shield secured to the housing in a spaced manner by a plurality of "U" bolts; and
   whereby said shield protects the axle and the motor/generator air inlet from contamination.

4. The electric powered vehicle as defined in claim 1 further comprising:
   a plurality of tubular spacers positioned between said housing and said motor/generator to space apart said housing and said motor/generator;
   said spacers aligned with a plurality of openings formed in a flange of said motor/generator and a plurality of threaded apertures formed in said housing with a plurality of bolts engaging said aligned openings and passing through said tubular spacers to secure said motor/generator to said housing; and
   whereby a free circulation of air is allowed through and around the spacers to cool said motor/generator.

* * * * *

UNITED STATES PATENT AND TRADEMARK OFFICE
CERTIFICATE OF CORRECTION

PATENT NO. : 4,270,622
DATED : June 2, 1981
INVENTOR(S) : James M. Travis

It is certified that error appears in the above-identified patent and that said Letters Patent are hereby corrected as shown below:

In the Abstract, line 10, following "power source for" delete --rotatably--;

In the Abstract, line 23, insert a comma after "axle";

Column 1, line 21, preceding "more" delete "discloses" and insert --disclose--;

Column 2, line 44, following "32" insert --to decelerate the vehicle--;

Column 3, line 50, insert --is-- after "generator";

Column 4, line 1, insert a comma before "higher".

Signed and Sealed this

Twenty-fifth Day of August 1981

[SEAL]

Attest:

Attesting Officer

GERALD J. MOSSINGHOFF
Commissioner of Patents and Trademarks